(12) United States Patent
Mohammad et al.

(10) Patent No.: US 12,540,200 B1
(45) Date of Patent: Feb. 3, 2026

(54) HYDROXYETHYL CELLULOSE-BASED BRINE TREATMENT SOLUTION FOR ENHANCED OIL RECOVERY AND USES THEREOF

(71) Applicant: United Arab Emirates University, Al Ain (AE)

(72) Inventors: Ameera Mohammad, Al Ain (AE); Ali H. Al-Marzouqi, Al Ain (AE); Basim Abu Jdayil, Al Ain (AE); Noran Hussein Awad Elsayed Mousa, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 19/092,195

(22) Filed: Mar. 27, 2025

(51) Int. Cl.
*C09K 8/588* (2006.01)
*C08B 15/00* (2006.01)

(52) U.S. Cl.
CPC .............. *C08B 15/00* (2013.01); *C09K 8/588* (2013.01)

(58) Field of Classification Search
CPC .................. C08B 15/00; C09K 8/588
See application file for complete search history.

(56) References Cited

U.S. PATENT DOCUMENTS

2022/0056156 A1 * 2/2022 Mohammad .......... C09K 8/588

FOREIGN PATENT DOCUMENTS

WO  WO-2023161675 A1 * 8/2023 .............. C02F 1/463

\* cited by examiner

*Primary Examiner* — Kumar R Bhushan
(74) *Attorney, Agent, or Firm* — MH2 Technology Law Group, LLP (57) ABSTRACT

Disclosed is a method for preparing a Hydroxyethyl Cellulose (HEC) based brine treatment solution for Enhanced Oil Recovery (EOR). The method involves preparing a high-salinity brine solution, extracting purified cellulose from a biomass, and modifying it through hydroxyethylation to obtain a water-soluble HEC. The water-soluble HEC is mixed with the brine solution to achieve an HEC-brine mixture that undergoes electrochemical reactions inside an electrocoagulation cell, which upon adding air-$CO_2$ mixture, provide a foamy HEC-brine solution including $CO_2$ absorbed particles and brine salts. The foamy HEC-brine solution is then used for Enhanced Oil, altering reservoir rock wettability and improving oil displacement in a cost-effective, environmentally friendly, sustainable, and scalable manner.

18 Claims, 7 Drawing Sheets

HYDROXYETHYL CELLULOSE-BASED BRINE TREATMENT SOLUTION FOR ENHANCED OIL RECOVERY AND USES THEREOF

FIELD OF THE INVENTION

The invention relates to a field of oil recovery from oil fields. In particular, the invention relates to Hydroxyethyl Cellulose (HEC) based brine treatment solution for Enhanced Oil Recovery (EOR).

BACKGROUND OF THE INVENTION

The extraction of oil from mature oil fields is critical for oil companies due to the natural decline in oil levels as field ages and the decreasing rate of new oil reserve discoveries. Therefore, it is crucial to maximize oil recovery from these mature fields to ensure a sustainable supply and address energy shortages.

Various techniques and methods have been developed to maximize or enhance the oil recovery from the mature fields. The Enhance Oil Recovery (EOR) encompasses various methods involving the injection of fluids and/or heat into a hydrocarbon reservoir to stimulate the flow of oil towards production wells. Various EOR methods have been implemented in commercial operation including smart water flooding, conventional water flooding, surfactant flooding, polymer flooding, solvent flooding, $CO_2$ injection, and steam injection to enhance oil recovery.

Certain EOR techniques employ specific mechanisms and focus on altering fluid properties to achieve desired outcome of enhance oil recovery. These techniques involve modifying oil viscosity, interfacial tension, and the level of miscibility between reservoir fluids and injected fluids. By targeting these characteristics, these methods aim to optimize the interaction between the injected fluids and the reservoir, thereby enhancing oil recovery. These modifications facilitate the movement of oil within the reservoir and its subsequent extraction. Other mechanisms emphasize the interaction between the rock formation and the fluids. For instance, one mechanism involves altering the wetting properties of the reservoir rock to enhance the displacement of oil by injected fluids. Additionally, certain techniques involve controlling the flow of fluids within the reservoir by selectively blocking high-permeability zones. This restriction of flow helps to improve the production of desired fluids.

Other techniques include chemical injection of specially prepared mixtures containing alkali, surfactant, and polymer into the reservoir. In alkaline flooding, the injected chemical interacts with the rock surface, altering its wettability and making it more water-wet. While surfactant flooding enhances oil recovery by lowering the interfacial tension between the reservoir fluids and the injected fluids, also inducing changes in wettability and improving the efficiency of oil displacement within the reservoir. On the other hand, polymer flooding involves the introduction of polymers into the injected water, resulting in increased viscosity. This rise in viscosity decreases the mobility ratio, which is advantageous for oil recovery. The improved sweep efficiency achieved through polymer flooding allows for more effective displacement of oil within the reservoir, ultimately enhancing the overall recovery process.

Surfactants are promising agents within realm of chemical flooding techniques, as they reduce interfacial tension between water and oil, generate emulsions that trap crude oil, and alter the wetting characteristics of reservoir rocks. These effects collectively facilitate the movement of oil towards production wells and contribute to enhanced recovery efficiencies. The salinity of the reservoir fluid significantly impacts the effectiveness of surfactant flooding by influencing the oil-water phase behaviour. The presence of salt in the reservoir fluid can induce salting-in and salting-out effects, causing a redistribution of surface-active compounds between the oil and aqueous phases. This redistribution leads to changes in the interfacial tension between the oil and water. The optimal salinity level is achieved when the maximum number of surfactant molecules is adsorbed at the oil-water interface, resulting in the lowest interfacial tension value. The process of surfactant flooding has the capability to create emulsions between the oil and water phases. These emulsions increase the movement of the oil phase and enhance the efficiency of sweeping by blocking water channels and redirecting the subsequent flow of water towards unswept areas. This phenomenon aids in more effectively displacing oil and increasing recovery efficiencies.

Polymer flooding for oil recovery involves the use of synthetic polymers and biopolymers. Synthetic polymers include a variety of substances, including polyacrylamides and their derivatives, such as partially hydrolyzed polyacrylamide (HPAM) and hydrophobically associated polyacrylamide (HAPAM). Biopolymers encompass a range of substances such as scleroglucan, xanthan gum, carboxymethylcellulose, hydroxyethylcellulose (HEC), guar gum, welan gum, schizophyllan, cellulose, mushroom polysaccharide, and lignin. Among the various polymers used in EOR, HPAM is widely recognized as the most commonly used synthetic polymer in EOR applications due to its resistance to bacterial degradation, good water solubility, ability to control fluid mobility, and cost-effectiveness.

Further, brine solution also plays a critical role for EOR. Brine refers to a highly concentrated saltwater solution produced as a byproduct of the desalination process. The produced brine contains hazardous pretreatment chemicals, organics, heavy metals, and other contaminants that contribute to environmental pollution. When concentrated brine is discharged into bodies of water such as oceans or seas, it can alter natural salinity levels, adversely impacting the balance and health of marine organisms by causing eutrophication, fluctuations in pH, and an increase in heavy metal concentrations in marine environments. Additionally, this discharge can lead to the accumulation of salts and other harmful substances in the water, further disrupting the local ecosystem.

Efforts are being made to mitigate the impact of brine discharge from desalination plants through various strategies, such as dilution with seawater, advanced treatment technologies, and alternative disposal methods. Despite the widespread use of these alternative disposal methods, concerns about the long-term environmental and human health impacts have prompted the need for new approaches. One such approach is the implementation of Zero Liquid Discharge (ZLD) for treating desalination brine, which minimizes wastewater discharge by enabling the recovery of both freshwater and salt. Currently, there are two technologies specifically developed for treating brine, known as crystallizer and brine concentrator, which are used on a large scale. However, the widespread adoption of these technologies entails high capital and operating costs, making them economically burdensome. Therefore there is a need for more efficient and cost-effective ZLD systems that underscores the on-going problem of sustainable brine management.

For sustainable brine management, efforts are also being made to utilize the agricultural waste material such as date palm biomass. Each year, a date palm tree generates significant amounts of agricultural waste, including dry leaves and date pits. These agricultural by-products contain valuable components like cellulose, hemicelluloses, lignin, and other compounds, which can be leveraged through biomass valorization to produce biofuels, biochemicals, and other valuable products. However, instead of being utilized, these waste materials are often burned, posing a grave environmental threat. By converting date palm waste into biofuels, biochemicals, and other valuable products, the latent potential of this abundant organic material can be unlocked, contributing to a greener and more sustainable future. Furthermore, the date palm waste produces hydroxyethyl cellulose (HEC), a biopolymer with notable applications in Enhanced Oil Recovery (EOR). Hydroxyethyl cellulose (HEC) materials, belonging to a notable class of oilfield chemicals, are frequently employed to enhance the performance of drilling fluids in the oil and gas industry. Known for their effective control of water loss, substantial thickening capabilities, good stability, and high resistance to salt, HEC materials are highly sought-after additives in the oilfield industry. However, the relatively high cost and the need for larger quantities of HEC materials impose limitations on their standalone use. To overcome these challenges, HEC materials are commonly combined with other substances to enhance their performance. Nonetheless, there remains a need to optimize their application in oilfield operations to maximize their benefits.

Furthermore, numerous studies have explored different methods for Enhanced Oil Recovery and analyzed the wettability, thermal stability, biodegradability and rheological properties of HEC when incorporated into drilling fluids. These studies often involve combining HEC with a thickening agent, polycarboxylate dispersants, and polylactic acid.

To advance the sustainability in the oil industry, there is a need of cost effective, environmental friendly and sustainable techniques and methods that enable the utilization of biomass from agricultural waste in conjunction with rejected brine solution to enhance oil recovery in challenging reservoirs.

OBJECTIVE OF THE INVENTION

An objective of the invention is to provide a method that utilizes and converts renewable resources, such as date palm waste biomass, into valuable hydroxyethyl cellulose (HEC) to reduce environmental pollution.

Another objective of the invention is to provide a method that utilizes brine solution in conjunction with HEC to produce an HEC-based foamy solution for Enhanced Oil Recovery (EOR) from reservoirs by altering the surface characteristics of rocks, enhancing the displacement of oil, and capturing $CO_2$.

Another objective of the invention is to address environmental concerns related to brine disposal and $CO_2$ emissions, providing a sustainable, efficient, cost-effective, environmentally friendly alternative to traditional EOR techniques using renewable biomass-derived HEC to increase the oil yield from mature oil fields.

Another objective of the invention is to use HEC-based foamy solution for EOR.

The foregoing and other objects, features, and advantages of the present invention will become readily apparent upon further review of the following summary and detailed description of the preferred embodiment.

SUMMARY OF THE INVENTION

This section provides a general summary of the disclosure and is not a comprehensive disclosure of the full scope of its features.

In one aspect, the invention provides a method for Enhanced Oil Recovery (EOR) using a hydroxyethyl cellulose (HEC)-based brine treatment solution. The method comprises preparing a brine solution with a salinity ranging from 35,000 ppm to 85,000 ppm; obtaining water-soluble HEC from a biomass; mixing the obtained water-soluble HEC with the brine solution to obtain a HEC-brine mixture; adding the HEC-brine mixture in an Electrocoagulation Cell (EC) to induce electrochemical reactions and obtaining a foamy HEC-brine solution comprising $CO_2$ absorbed particles and brine salts; and separating solid by-products from the foamy HEC-brine solution to obtain the HEC based brine solution, wherein the solid by-products comprise $CO_2$-absorbed particles and brine salts.

In an embodiment, obtaining water-soluble HEC from a biomass comprises: extracting purified cellulose from the biomass and modifying the purified cellulose through hydroxyethylation to obtain the water-soluble HEC.

In an embodiment, the obtained water-soluble HEC and the brine solution are mixed in a ratio of about 1 g to 10 g of HEC:about 250 ml to 3000 ml of brine to obtain the HEC-brine mixture. For example, the obtained water-soluble HEC and the brine solution may be mixed in a ratio of about 1 g to 9 g of HEC (preferably 1 g to 8 g, 1 g to 7 g, 1 g to 6 g, 1 g to 5 g or 2 g to 5 g):about 350 ml to 2750 ml (preferably 450 ml to 2500 ml, 550 ml to 2250 ml, 650 ml to 2000 ml, 750 ml to 1750 ml, 750 ml to 1500 ml or 750 ml to 1250 ml) of brine.

In an embodiment, the ratio is about 2 g to 5 g of HEC:about 750 ml to 1250 ml of brine to obtain the HEC-brine mixture.

In an embodiment, the pH of the HEC-brine mixture is in a range of 10 to 11. In some embodiments, the pH of the HEC-brine mixture is in a range of 8 to 12, preferably 9 to 12, more preferably 10 to 12, even more preferably 10 to 11.

In an embodiment, air-CO2 mixture is added to the HEC-brine mixture in the Electrocoagulation Cell (EC) to induce electrochemical reactions and obtain a foamy HEC-brine solution comprising CO2 absorbed particles and brine salts.

In some embodiments, the method involves preparing a brine solution with a salinity ranging from 35,000 ppm to 85,000 ppm; extracting purified cellulose from a biomass and modifying the purified cellulose through hydroxyethylation to obtain a water-soluble HEC; mixing the obtained water-soluble HEC with the brine solution in a ratio of 2-5 g of HEC: 1000 ml of brine to obtain a HEC-brine mixture with pH in a range of 10 to 11; adding air-$CO_2$ mixture to the HEC-brine mixture in an Electrocoagulation Cell (EC) to induce electrochemical reactions and obtaining a foamy HEC-brine solution comprising $CO_2$ absorbed particles and brine salts; separating solid by-products from the foamy HEC-brine solution, wherein the solid by-products comprises $CO_2$-absorbed particles and brine salts.

In an embodiment, the brine solution is collected from desalination units as a by-product with high salinity in the range of 35,000 ppm to 85,000 ppm.

In an embodiment, the extracting purified cellulose from the biomass comprises separation of one or more non-cellulosic components from the biomass by subjecting it to Soxhlet extraction to provide a cellulose-rich biomass; removal of further impurities from the cellulose-rich biomass by acid leaching to obtain a cellulose-rich residue; purification of the cellulose-rich residue with sodium hydroxide under heat and stirring; bleaching of the purified cellulose-rich residue with acetic acid, hydrogen peroxide, and sulphuric acid for obtaining a bleached cellulose with increased purity.

In an embodiment, the soxhlet extraction is performed using a mixture of benzene and ethanol for separating one or more non-cellulosic components from the biomass.

In an embodiment, the acid leaching is performed using hydrochloric acid for removing further impurities from the cellulose-rich residue.

In an embodiment, modifying the purified cellulose through hydroxyethylation comprises reacting the bleached cellulose with sodium hydroxide and urea under mild reaction conditions to form the water soluble hydroxyethyl cellulose (HEC).

In an embodiment, the air-$CO_2$ mixture added to the HEC-brine mixture comprises 10% $CO_2$.

In another embodiment, the electrochemical reaction inside the EC cell is performed at a pH ranges from 10 to 11.

In another embodiment, the electrochemical reaction inside the EC cell is performed at a temperature of 22-35° C.

In another embodiment, the electrochemical reaction is performed for 2 to 3 hours, leading to a 35% to 45% decrease in the salinity of the brine solution.

In another embodiment, the EC cell comprises a magnetic stirrer, rotating at a speed of 100-150 rpm to ensure thorough mixing of the HEC-brine mixture and $CO_2$ gas.

In another embodiment, the EC cell contains a pair of rectangular aluminium plates serving as electrodes with a spacing distance of 30-50 mm between them.

In another embodiment, the electrodes are connected to a power supply delivering a voltage ranging from 1 to 5 V.

In another embodiment, separating the solid by-products from the foamy HEC-brine solution is performed by vacuum filtration or freeze drying to separate extracted brine salts and $CO_2$-absorbed particles.

In another aspect, the invention provides a foamy HEC-brine solution for Enhanced Oil Recovery (EOR) prepared by the above method.

In an embodiment, the foamy HEC-brine solution forms a Winsor III microemulsion at a temperature of 90° C. to facilitate oil recovery.

In an embodiment, the foamy HEC-brine solution produced by the electrochemical reactions exhibits enhanced stability, viscosity, and $CO_2$ sequestration potential for use in high-salinity, high-temperature carbonate oil reservoirs.

In yet another aspect, the invention provides a use of foamy HEC-brine solution for Enhanced Oil Recovery (EOR), wherein the foamy HEC-brine solution exhibits rheological properties, measured by rheometer at varying shear rates, at concentrations of 500 ppm, 1000 ppm, and 2000 ppm with seawater, showing that higher the HEC-brine concentrations greater the viscosity and shear resistance compared to seawater.

In an embodiment, the foamy HEC-brine solution upon interaction with crude oil show reduction of an interfacial tension between them by at least 79%-98% compared to seawater.

In an embodiment, the foamy HEC-brine solution alters wettability of reservoir rock surfaces to a water-wet condition by reducing a contact angle of at least 69%-90% compared to the seawater to facilitate improved oil displacement.

Various objects, features, aspects, and advantages of the inventive subject matter will become more apparent from the following detailed description of preferred embodiments, along with the accompanying drawing figures.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings or figures, of which.

DETAILED DESCRIPTION OF THE INVENTION

The embodiments herein and the various features and advantageous details thereof are explained more fully with reference to the non-limiting embodiments that are illustrated in the accompanying drawings and the following description.

Numerous variations, changes, and substitutions may occur to those skilled in the art without departing from the invention. It should be understood that various alternatives to the embodiments of the present disclosure herein may be employed.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms used in the application, as all equivalents, synonyms, new developments, and terms or techniques that serve the same or a similar purpose are considered to be within the scope of the present claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The present invention relates to a method for Enhanced Oil Recovery (EOR) from high-salinity, high-temperature carbonate reservoirs by producing a hybrid low IFT stable foamy HEC-brine solution. The present invention utilizes electrocoagulation (EC) treatment under specific operational conditions which enhances the HEC-brine solution properties for EOR. The EC treatment markedly increases the efficiency of the foamy HEC-brine solution with improvement in oil displacement and $CO_2$ sequestration, especially in challenging high-salinity, high-temperature environments.

The synthesis of hydroxyethyl cellulose (HEC) can be done through a multi-step process involving the extraction, purification, and chemical modification of biomass to obtain a high-quality cellulose product. Said process comprises: biomass is first subjected to Soxhlet extraction using a benzene/ethanol mixture to remove resins, waxes, and other non-cellulosic components. The extracted biomass then undergoes acid leaching with hydrochloric acid to eliminate impurities, followed by an alkali treatment with sodium hydroxide under heat and stirring to further purify the cellulose. This is followed by a bleaching process involving acetic acid, hydrogen peroxide, and sulfuric acid to achieve high whiteness and purity. Finally, the bleached cellulose undergoes hydroxyethylation by reacting with sodium hydroxide and urea under mild conditions, resulting in the formation of water-soluble hydroxyethyl cellulose.

Figure 1:
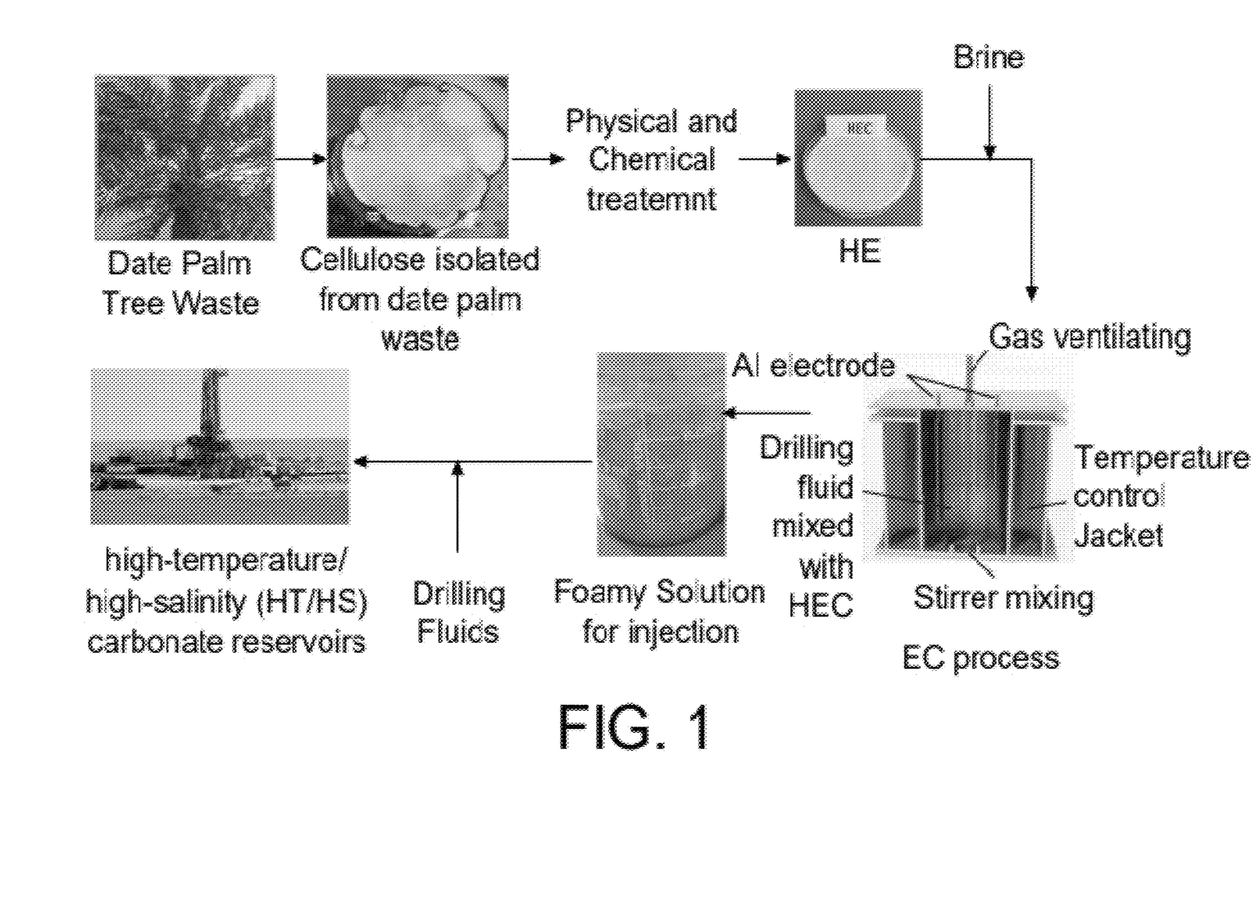
FIG. 1 illustrates a method of extracting a foamy HEC-brine solution for high-temperature/high salinity carbonate reservoirs to improve oil recovery, in accordance with an embodiment of the present invention.

FIG. 1 illustrates a method of extracting a foamy HEC-brine solution for high-temperature/high salinity carbonate reservoirs to improve oil recovery, in accordance with an embodiment of the present invention. Hydroxyethyl cellulose (HEC), a critical component for enhancing the efficiency of brine desalination and $CO_2$ capture, was synthesized from renewable biomass. The process involved several stages, including extraction, purification, and chemical modification to obtain a high-purity, water-soluble cellulose derivative. The unique aspect of the present invention lies in the innovative application of hydroxyethyl cellulose (HEC) derived from date palm waste biomass in the enhancement of oil recovery (EOR) processes. This novel use of natural, renewable materials for oil recovery offers several key features that distinguish it from existing methods:

As a first step of the process, real reject brine samples were sourced from a local desalination plant that employs multi-stage flash distillation (MSF). In an embodiment, the brine sample is collected from desalination units as a by-product with high salinity in the range of 35,000 ppm to 85,000 ppm. These samples were subjected to an extensive characterization process to determine key parameters critical for understanding the brine's composition and behavior during treatment. The brine samples were analyzed for pH, salinity, and ion concentrations using highly calibrated meters to ensure accurate and reproducible measurements.

Specifically, pH of the samples was assessed with a standard pH meter, ensuring accurate representation of the brine's acidity/alkalinity. This was followed by salinity measurement that was quantified using a conductivity meter calibrated with standardized solutions. The samples were further analysed for determining ion concentrations using ion chromatography and ion-selective electrodes in order to capture the diversity of ions present in the brine, thereby providing essential data for the subsequent treatment processes.

The obtained biomass was subjected to Soxhlet extraction using a benzene/ethanol mixture to remove resins, waxes, and other non-cellulosic components followed by an acid Leaching with hydrochloric acid to remove any remaining impurities and obtain a cellulose-rich residue. The cellulose-rich residue was then treated with sodium hydroxide under heat and stirring to further purify the cellulose and underwent a bleaching process involving acetic acid, hydrogen peroxide, and sulphuric acid to achieve high whiteness and purity of the cellulose.

Finally, hydroxyethylation, to introduce the hydroxyethyl group, was carried out by reacting the bleached cellulose with sodium hydroxide and urea under mild reaction conditions, resulting in the formation of hydroxyethyl cellulose, modifying the cellulose structure for increased solubility and reactivity in the brine environment. The HEC was then mixed with brine at specific mass-to-volume ratios (2-5 g HEC to 1000 ml brine) to achieve a pH range of 10-11, which is critical for the subsequent electrocoagulation process, and $CO_2$ capture processes.

Once prepared, the HEC-brine mixture was introduced into an electrocoagulation cell to induce electrochemical reactions for brine desalination and $CO_2$ capture. The system was designed to enhance brine desalination while capturing $CO_2$. To support the electrocoagulation (EC) and $CO_2$ capture processes, an air-$CO_2$ gas mixture was sourced from a local gas supplier. The mixture contained 10% $CO_2$ and 90% air, ensuring a controlled and consistent supply of $CO_2$ for the reaction environment. This mixture was carefully introduced into the electrocoagulation cell to facilitate $CO_2$ dissolution and interaction with the brine during the desalination process. During this process, bubbling of an air-$CO_2$ mixture (10% $CO_2$) was applied to the system to aid in $CO_2$ capture.

The electrochemical reactions occurs at a temperature range of 22-35° C. inside the EC cell, where $CO_2$ gas is introduced via an inlet tube extending to the bottom of the cell. A magnetic stirrer, positioned centrally within the inner cylinder and rotating at 100-150 rpm, ensures thorough mixing of the HEC-brine mixture and $CO_2$ gas. The EC cell contains rectangular aluminum plates acting as electrodes, spaced 30-50 mm apart, and with a voltage ranging from 1 to 5 V applied to induce the electrochemical reactions. The process typically lasts for 2-3 hours, achieving a 35-45% reduction in brine salinity.

The electrochemical reactions induced the formation of a foamy HEC-brine solution, which exhibited the potential for further use in enhanced oil recovery (EOR) applications. The electrochemical reaction induces the transformation of the hydroxyethyl cellulose (HEC)-brine mixture into a foamy HEC-brine solution, which holds significant potential for enhanced oil recovery (EOR) applications. This foamy HEC-brine solution can act as an effective drilling fluid in high-salinity, high-temperature carbonate reservoirs, improving oil recovery efficiency. The foamy HEC-brine solution was carefully monitored for key performance indicators such as stability, viscosity, and its ability to capture $CO_2$, demonstrating an increase in the efficiency of both brine desalination and $CO_2$ sequestration.

Solid by-products, including extracted brine salts and carbonated products, are separated from the foamy HEC-brine solution using vacuum filtration or freeze drying. This comprehensive process enhances oil displacement by improving the wettability of reservoir rocks and can effectively address challenges in EOR operations.

The present invention provides a novel approach for improving oil recovery from mature and low-productivity oilfields. The invention leverages an innovative foamy hydroxyethyl cellulose (HEC)-brine solution to enhance oil recovery (EOR) and address environmental challenges associated with brine disposal in desalination processes. The technology combines the benefits of biodegradable polymers with cutting-edge methods for $CO_2$ capture and brine desalination, offering a sustainable solution for two major industries: oil and gas, and desalination.

By incorporating the foamy HEC-brine solution into seawater at varying concentrations, the invention increases viscosity, alters reservoir rock wettability, and reduces interfacial tension, all of which contribute to enhanced oil displacement and recovery. The use of HEC, a renewable and biodegradable polymer, makes the process environmentally friendly and cost-effective compared to conventional chemical EOR methods. Early field trials demonstrate its effectiveness in increasing oil production and improving operational efficiency.

The present invention also addresses the growing concern of brine disposal and $CO_2$ emissions in desalination plants. By introducing the HEC-brine mixture into desalination processes, it not only helps in reducing the volume of brine waste but also facilitates $CO_2$ capture by converting carbon dioxide into stable carbonates and bicarbonates. This process enhances the environmental sustainability of desalination activities, making it a viable solution for water-scarce regions that rely on desalinated water.

The invention holds significant potential for industries seeking to enhance oil recovery while minimizing environmental impact. Additionally, it provides a promising solution for desalination plants facing challenges related to brine disposal and $CO_2$ emissions. The combination of these capabilities positions the technology as a key contributor to both energy efficiency and environmental sustainability in these critical industries.

Following the electrochemical reaction, the solids collected after freeze-drying underwent further analysis to determine the nature and composition of the materials recovered. These solids were meticulously characterized using advanced analytical techniques, including Scanning Electron Microscopy (SEM), Energy Dispersive X-ray Spectroscopy (EDS), X-ray Diffraction (XRD), and Raman spectroscopy.

EXAMPLES

The following example has been given to illustrate and give a more detailed explanation of the claimed present invention. The examples are given to exemplify the present invention and they are not to be considered to limit the scope for the present invention.

Preparation of HEC-Brine Solution after Electrochemical Reactions

The brine was combined with HEC in a ratio of 2-5 grams of HEC per 1000 milliliters of brine, and the electrochemical process was conducted at a pH range of 10 to 11. An air-$CO_2$ mixture containing 10% $CO_2$ was applied to enhance the process, which took place at a temperature range of 22-35° C. inside an electrocoagulation (EC) cell. The $CO_2$ gas was introduced through an inlet tube extending to the bottom of the cell, while a centrally positioned magnetic stirrer, rotating at 100-150 rpm, ensured thorough mixing of the HEC-brine mixture and $CO_2$ gas. The EC cell contained rectangular aluminum electrodes, spaced 30-50 mm apart, with a voltage of 1 to 5 volts applied to induce the electrochemical reactions. The process typically lasted for 2-3 hours, achieving a 35-45% reduction in brine salinity. Solid by-products, including extracted brine salts and carbonated products, were separated from the foamy solution using vacuum filtration or freeze drying. The resulting foamy HEC-brine solution enhanced oil displacement by improving the wettability of reservoir rocks.

Once the HEC-brine mixture was created and processed, a series of experiments were conducted to assess its physical properties, which are crucial for its application in EOR.

FIG. 2A-2D illustrate analytical data for collected solids after the electrocoagulation process of brine-HEC and $CO_2$ reaction, in accordance with an embodiment of the present invention. Following the electrochemical process, the solids collected after freeze-drying were subjected to further analysis to assess the nature and composition of the materials recovered. These solids were characterized using advanced analytical techniques, including Scanning Electron Microscopy (SEM), Energy Dispersive X-ray Spectroscopy (EDS), X-ray Diffraction (XRD), and Raman spectroscopy.

Figure 2A:
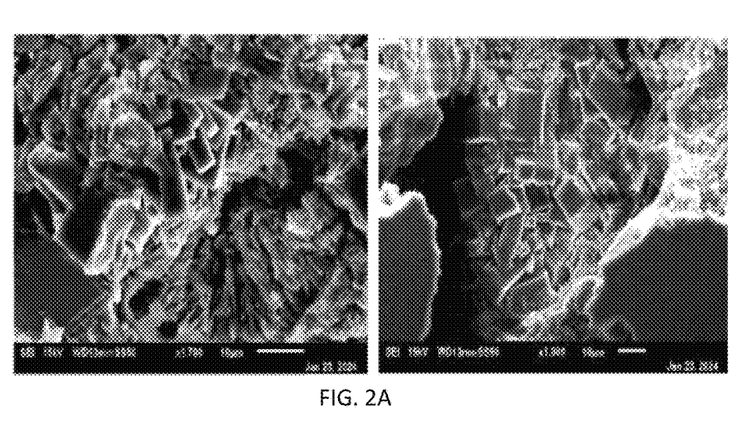
FIG. 2A-2D illustrate analytical data of collected solids after electrocoagulation process of brine-HEC and $CO_2$ reaction, in accordance with an embodiment of the present invention.
Figure 2B:
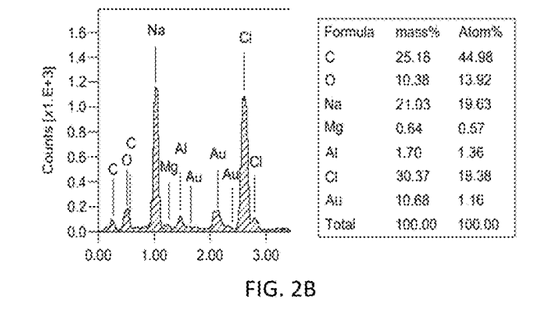

FIG. 2A illustrates the SEM image that reveals a structured composite of particulate matter, with the morphology of the solids showing a significant degree of aggregation, indicative of interactions between brine salts, $CO_2$, and the HEC. FIG. 2B illustrates the EDS analysis that confirmed the presence of several key elements, including carbon, oxygen, sodium, magnesium, and chlorine, consistent with the anticipated chemical composition of the captured $CO_2$ in the form of carbonates and bicarbonates, alongside brine salts such as sodium chloride and magnesium hydroxide. These observations confirm the measured salinity reduction of brine of 35-45%.

Figure 2C:
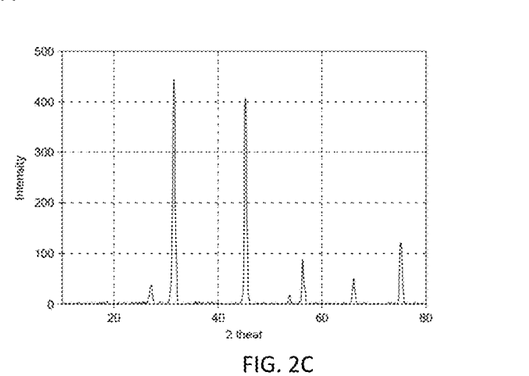
Figure 2D:
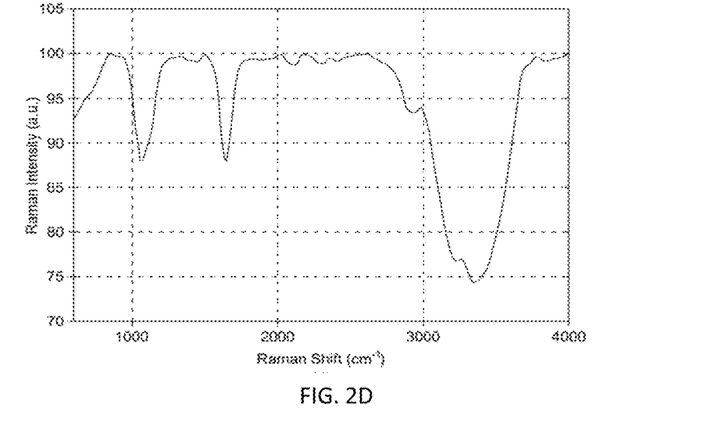

FIG. 2C illustrates the XRD analysis and provides further insights into the crystallinity of the solid products, revealing distinct diffraction patterns corresponding to crystalline forms of sodium carbonate, magnesium hydroxide, and other mineral salts. FIG. 2D depicts the Raman spectroscopy analysis complemented the XRD findings by identifying characteristic peaks corresponding to carbonate and bicarbonate functional groups, further confirming the successful capture of $CO_2$ in the solid phase. The cellulose structure, primarily composed of carbon, was also evident, reinforcing the integration of HEC with brine salts and $CO_2$ during the electrocoagulation process.

The results demonstrated in FIG. 2A-2D demonstrate the successful recovery of some brine salts and captured $CO_2$ as carbonates, bicarbonates, and other salts, such as sodium carbonate, magnesium hydroxide, and sodium chloride, which are essential components in the treatment and reuse of reject brine. The integration of HEC with the brine solution not only aids in $CO_2$ capture but also plays a crucial role in modifying the structure and properties of the treated liquid mixture especially after the electrochemical treatment, offering a promising foamy solution has a great potential to be utilized in enhanced oil recovery process and further confirmed the measured salinity reduction of brine of 35-45%.

To further understand the behavior of the Dil.-HEC-brine mixture in oil recovery applications, the interfacial tension (IFT) between the prepared mixture and Sahil oil using a spinning drop tensiometer was measured. The IFT measurement is a critical parameter in EOR, as a reduction in interfacial tension enhances the ability of water (or brine) to displace oil within porous media by decreasing the capillary forces holding the oil in place.

Evaluation of Rheological and Interfacial Properties

For an initial assessment of the HEC-brine mixture after electrochemical process and $CO_2$ capture, diluted hydroxyethyl cellulose (HEC) and brine mixture were prepared by introducing varying concentrations of the resulting foamy solution into seawater. Specifically, three different concentrations of the mixture, that is 500 ppm, 1000 ppm, and 2000 ppm, were added into one liter of seawater to produce the diluted HEC-brine mixture (Dil.-HEC-brine). The concentrations were selected to evaluate the effect of different HEC-brine ratios on the rheological properties and overall behavior of the mixture in an oil recovery setting.

The rheological properties of the Dil.-HEC-brine mixtures were thoroughly assessed using a rheometer (Anton Paar MCR 301, Physica, Graz, Austria), equipped with parallel plate geometry. The tests were performed at various shear rates to measure viscosity and yield stress, providing crucial insights into the flow behavior of the mixture under conditions relevant to oil recovery. The effectiveness of the HEC-brine mixture in EOR applications was evaluated by Viscosity and Shear Resistance Enhancement.

Figure 3A:
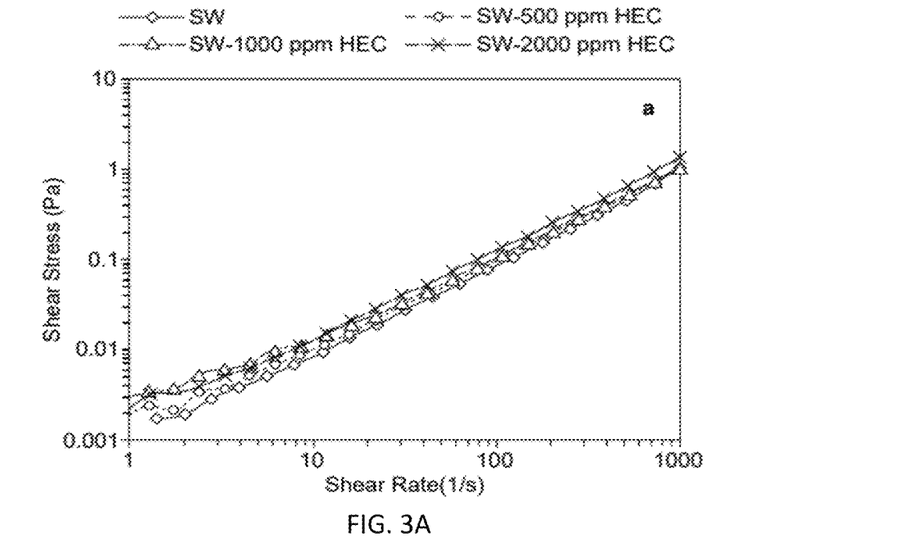
FIG. 3A-3B illustrate the rheological behaviour and viscosity profiles of the Dil.-HEC-brine mixture at various concentrations, highlighting the mixture's enhanced performance at higher HEC concentrations, in accordance with an embodiment of the invention.
Figure 3B:
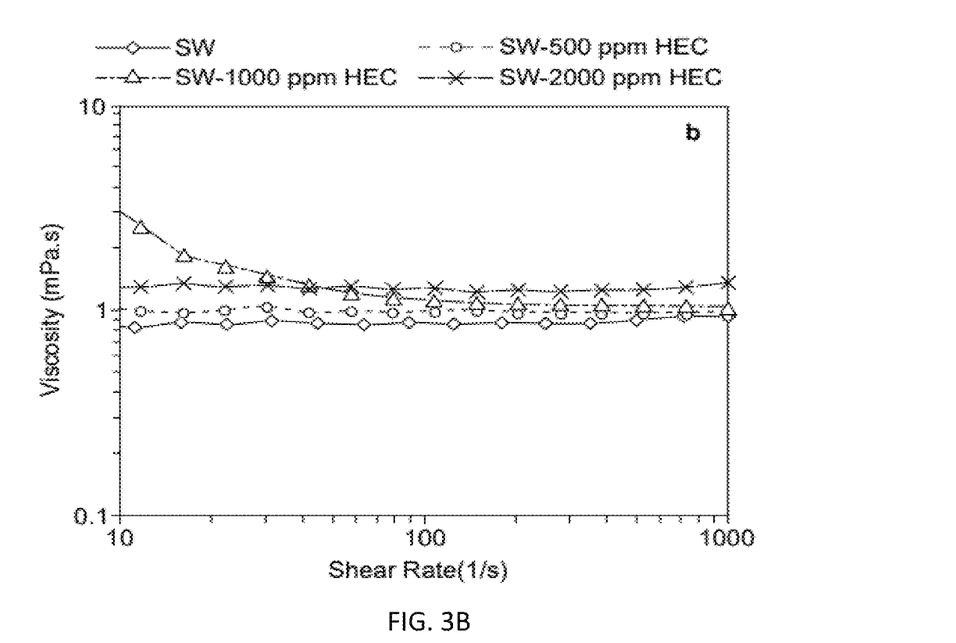
Figure 4A:
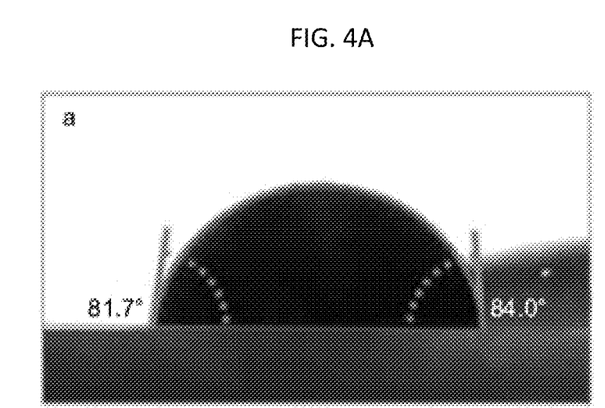
FIG. 4A-4D illustrate various contact angle measurements conducted to assess the wettability of the treated surfaces, in accordance with an embodiment of the invention.
Figure 4B:
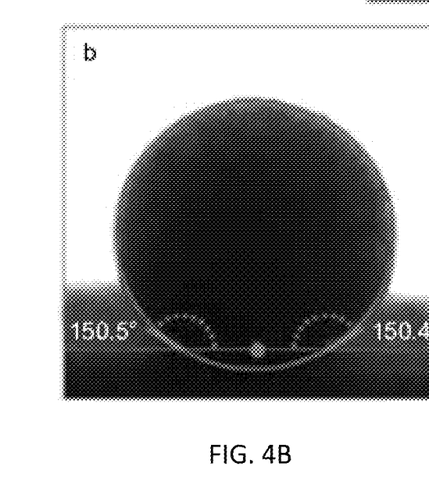
Figure 4C:
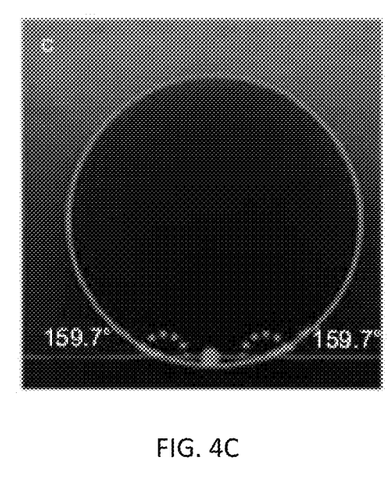
Figure 4D:
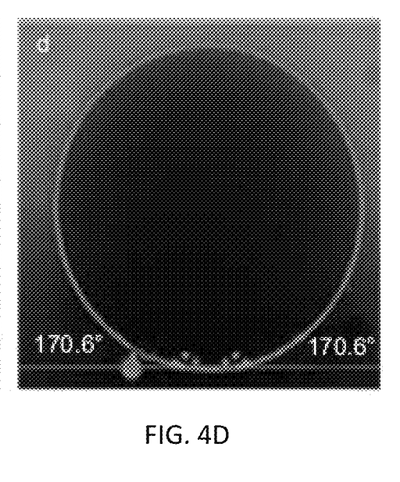

FIG. 3A-3B illustrate the observed rheological behavior and viscosity profiles of the Dil.-HEC-brine mixture at various concentrations, highlighting the mixture's enhanced performance at higher HEC concentrations, in accordance with an embodiment of the invention. The measured viscosity profiles revealed that the addition of HEC to brine significantly increases the mixture's viscosity, especially at higher concentrations of HEC. This increase in viscosity is beneficial in EOR processes, as higher viscosity can improve the sweep efficiency and help in the mobilization of trapped oil within reservoir rock. The ability of the HEC-brine mixture to increase the viscosity and shear resistance of the injected fluid, thereby improving sweep efficiency in oil reservoirs, was tested.

The increase in viscosity was attributed to the hydrophobically associating properties of HEC, which demonstrated superior shear resistance in high-salinity environments.

Evaluation of Contact Angle Measurements to Assess the Wettability of the Treated Surfaces Contact angle measurements were conducted to assess the wettability of the rock surfaces in the presence of the Dil.-HEC-brine mixture. Contact angle measurements were conducted using a goniometer to assess the wettability of rock surfaces in the presence of the diluted HEC-brine mixture. Contact angle measurements were conducted using a Drop Shape Analyzer (DSA25 Basic, KRUSS, Germany) to assess how the HEC-brine mixture influences the wettability of reservoir rock surfaces. A reduction in contact angle indicates that the mixture could enhance oil recovery by shifting the wettability towards a more water-wet condition.

Wettability plays a crucial role in the efficiency of EOR, as it affects the ability of injected fluids to spread and displace oil within reservoir rocks. The alteration of wettability toward a more water-wet condition generally improves oil recovery by enhancing the displacement of oil within the reservoir. The addition of the hydroxyethyl cellulose (HEC)-brine mixture into seawater at concentrations of 500 ppm, 1000 ppm, and 2000 ppm was found to shift the wettability of rock surfaces towards a more water-wet condition, facilitating better oil displacement and recovery.

FIG. 4A-4D illustrate various contact angle measurements conducted to assess the wettability of the treated surfaces, in accordance with an embodiment of the invention. The contact angle of the Dil.-HEC-brine mixture on rock surfaces was found to decrease with increasing HEC concentration, suggesting a shift towards a more water-wet condition. The contact angle decreased from approximately 96.3° in seawater (0 ppm) to 29.5°, 20.3°, and 9° at 500 ppm, 1000 ppm, and 2000 ppm of the HEC-brine mixture, respectively.

This progressive reduction in contact angle indicates an increasing water-wet condition, which is conducive to better oil displacement during EOR. This alteration in wettability is beneficial for EOR, as it enhances the displacement of oil from rock pores, improving oil recovery efficiency.

Evaluation of Interfacial Properties

In addition to wettability, interfacial tension (IFT) is another critical parameter influencing oil recovery in porous media. IFT determines the ease with which oil can be displaced by the injected brine or water, and reducing IFT is known to enhance oil mobility. Interfacial tension (IFT) measurements were performed using a spinning drop tensiometer to assess the effects of different HEC concentrations on the interfacial tension between the HEC-brine mixture and light crude oil.

Figure 5:
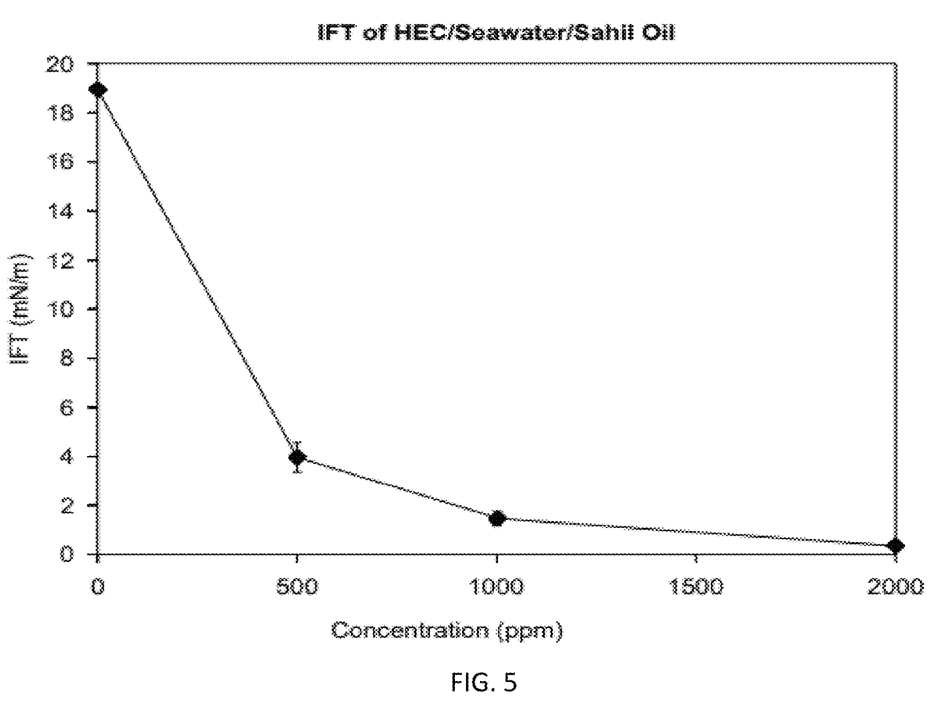
FIG. 5 illustrates measurement of interfacial tension (IFT) between the prepared HEC-brine mixture and light crude oil across different concentrations, in accordance with an embodiment of the invention.

FIG. 5 illustrates the measurement of interfacial tension (IFT) between the prepared HEC-brine mixture and light crude oil across different concentrations, in accordance with an embodiment of the invention. The IFT between the prepared HEC-brine mixture and light crude oil was measured across different concentrations of the mixture. At 0 ppm (seawater), the IFT was 18.950 mN/m, which is the highest observed. As the concentration of the HEC-brine mixture increased, the IFT progressively decreased to 3.953 mN/m at 500 ppm, 1.460 mN/m at 1000 ppm, and 0.313 mN/m at 2000 ppm.

This significant reduction in IFT indicates that the HEC-brine mixture plays a crucial role in lowering the interfacial resistance between oil and water, which is essential for improving oil recovery. The ability of HEC to stabilize oil-in-water emulsions by forming a film at the oil-water interface is responsible for this reduction in IFT. These results highlight the potential of the HEC-brine mixture in improving oil recovery through its ability to alter wettability and reduce interfacial tension. By enhancing the water-wet condition and lowering the IFT, the mixture facilitates better displacement and mobilization of trapped oil, thereby increasing the overall oil recovery. These findings are consistent with established EOR principles, which emphasize the importance of modifying interfacial properties to improve oil recovery efficiency.

Phase Behavior Analysis

Phase behavior analysis was conducted to investigate the formation of solid phases and emulsions under different conditions. The phase behaviour of the HEC-brine mixture was examined at various concentrations (500 ppm, 1000 ppm, and 2000 ppm) of HEC-brine mixture in seawater and temperatures (room temperature and 90° C.) to determine how the mixture interacts with oil and seawater, Observations were made at room temperature over a period of three days (FIG. 6) and at 90° C. for one hour (FIG. 7).

The phase behavior experiments were aimed at assessing the stability and separation tendencies of emulsions formed under varying concentrations of HEC-brine mixture and crude oil. The system was further observed for phase transitions (Winsor I, II, III) by mixing the HEC-brine solution with light crude oil at varying concentrations and temperatures. The formation of microemulsions and the transition between different phases were closely monitored.

Experiments were conducted at 90° C. to study the behaviour of the HEC-brine-oil system at elevated temperatures. The temperature shift was observed to induce the system to transition into a Winsor III microemulsion, which is favourable for oil recovery. The formation of emulsions when the real oilfield was mixed with the Dil.-HEC-brine mixture at a 1:1 volumetric ratio was observed. Over time, the emulsions exhibited changes in appearance and stability, which were monitored visually and through further testing. The emulsions stabilized at higher concentrations of HEC, indicating the ability of the prepared mixture to emulsify oil effectively, which can enhance oil mobilization in reservoir conditions.

Figure 6:
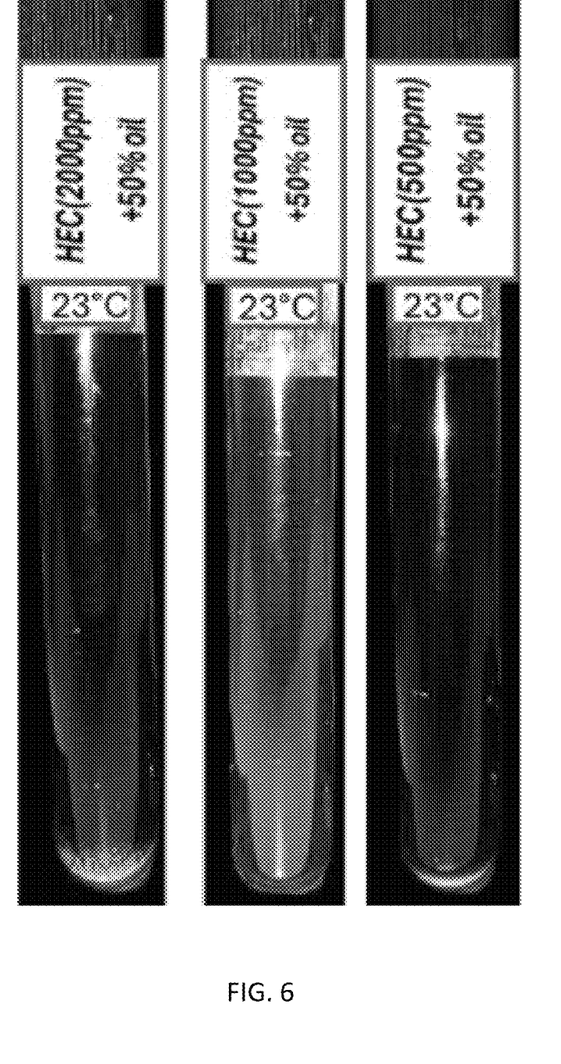
FIG. 6 illustrates the phase behaviour of the seawater/oil emulsions using HEC, in accordance with an embodiment of the invention.
Figure 7:
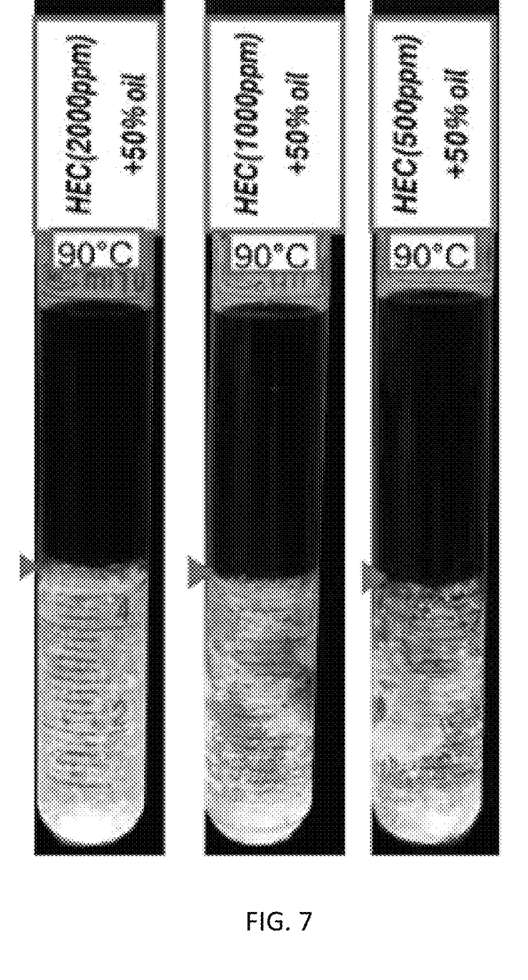
FIG. 7 illustrates the stability and separation tendencies of emulsions formed under varying concentrations of HEC-brine mixture and crude oil in accordance with an embodiment of the invention.

FIG. 6 illustrates the phase behavior of the seawater/oil emulsions using HEC, in accordance with an embodiment of the invention. The phase behavior of the seawater/oil emulsions using HEC at 23° C. after 72 hours was observed. At room temperature, the emulsion containing 2000 ppm HEC exhibited minimal separation, with only 0.4 mL of phase separation recorded after three days, indicating slow kinetics of phase separation. This suggests that the emulsion remained relatively stable at ambient conditions, which is beneficial for oil recovery, as it may enhance the stability of the emulsion in the reservoir and reduce the need for constant injection adjustments.

FIG. 7 illustrates the stability and separation tendencies of emulsions formed under varying concentrations of HEC-brine mixture and crude oil in accordance with an embodiment of the invention. When the phase behavior was tested at an elevated temperature of 90° C. using a laboratory oven, a shift in the microemulsion type was observed. The HEC/SW/oil emulsions transitioned towards a Winsor III microemulsion state, which is typically characterized by the formation of a waxy brown precipitate in the liquid phase. At 90° C., the distinctive formation of a waxy brown network in the liquid phase, observed in the absence of ionic liquids (ILs) and light crude oil, suggests the involvement of unique interactions under specific conditions. These interactions could be related to the hydrogel properties of HEC, which includes swelling and water penetration capabilities. These characteristics likely contribute to the formation of these networks within the solution, influencing the phase behavior and, consequently, the emulsion's ability to mobilize oil in EOR processes.

This transition is indicative of changes in the phase structure as the temperature increases, altering the interaction between the HEC-brine mixture and the crude oil. The presence of the waxy brown precipitate may result from complex interactions between HEC and other components of the mixture, potentially leading to the formation of solid networks within the solution. This formation is attributed to the interaction between HEC and other system components, potentially offering benefits such as improved oil mobility and better sweep efficiency in EOR applications.

The results indicated a significant reduction in Interfacial Properties (IFT), particularly at higher concentrations of HEC, demonstrating the potential of the mixture to effectively reduce the interfacial tension between oil and water phases, which is vital for improving oil recovery efficiency.

Results and Conclusions

The present invention provides a novel approach by integrating electrocoagulation (EC) treatment under specific operational conditions to further enhance the properties of the HEC-brine solution for EOR applications. Unlike conventional methods, the present invention leverages an electrochemical process to produce foam that significantly improves the effectiveness of the HEC-brine mixture for EOR in high-salinity, high-temperature carbonate reservoirs. This foam enhances oil displacement efficiency by improving mobility control and modifying the reservoir's wettability.

The introduction of an electrocoagulation (EC) cell, induces the electrochemical reactions that generate a foamy HEC-brine solution. The invention specifies precise electrochemical or electrocoagulation conditions, including voltage (1-5 V), electrode configuration (rectangular aluminum plates with 30-50 mm spacing), magnetic stirring (100-150 rpm), and reaction duration (2-3 hours). These parameters ensure the controlled formation of a stable foamy solution with superior rheological and interfacial properties for EOR. The electrochemical reactions actively incorporate $CO_2$ gas into the system, facilitating $CO_2$ adsorption onto brine salts and solid by-products. This enhances the sequestration potential of the foamy solution while improving its effectiveness in reducing interfacial tension and altering wettability.

The role of the described Dil.-HEC-brine mixture in enhanced oil recovery (EOR) applications revealed capable results. The introduction of the HEC-brine mixture to seawater led to a marked increase in viscosity, with the hydrophobically associating properties of the prepared mixture demonstrating superior performance in terms of miscibility and shear resistance. The ability of the mixture to maintain stability under shear stress is critical for EOR applications, where fluids often experience turbulent flow conditions in reservoir environments. The superior shear resistance also indicates that the mixture could be injected into reservoirs without significant degradation, ensuring its effectiveness in long-term oil recovery operations.

The electrocoagulated HEC-brine solution demonstrates a substantial reduction in interfacial tension (79%-98% compared to seawater) and a significant alteration in rock wettability (contact angle reduction of 69%-90%). These enhancements are critical for increasing oil recovery efficiency. Further, the method achieves a salinity reduction of 35%-45%, contributing to sustainable water management. Additionally, the separation of brine salts and carbonated products through vacuum filtration or freeze-drying provides an opportunity for by-product valorization. The foamy HEC-brine solution exhibits enhanced stability, viscosity, and shear resistance, making it well-suited for high-temperature (90° C.) carbonate reservoirs. The formation of Winsor III microemulsions further supports its efficiency in EOR.

The Dil.-HEC-brine mixture exhibited favorable surface and interfacial properties, making it an ideal candidate for EOR applications. These initial findings underscore the potential of the prepared Dil.-HEC-brine mixture as an effective EOR agent. The ability of the mixture to increase viscosity, reduce interfacial tension, and alter wettability makes it a highly attractive option for improving oil recovery from challenging reservoirs. The demonstrated effectiveness in laboratory settings supports the viability of this mixture for large-scale EOR applications, offering significant practical benefits in terms of enhanced oil production and environmental sustainability.

This invention introduces an advanced, eco-friendly, and efficient method for improving oil displacement, $CO_2$ sequestration, and reservoir wettability modification. The electrochemical enhancement of any reagent used for EOR via electrocoagulation represents a significant advancement beyond conventional approaches. In comparison with other biodegradable polymers such as carboxymethylcellulose and cellulose nanocrystals, the HEC-brine mixture demonstrated superior performance in reducing interfacial tension and enhancing oil recovery. This performance underscores the potential of HEC-based solutions in the EOR field, offering a more environmentally friendly and cost-effective alternative to conventional surfactants.

Advantages

This methodology outlined here describes a comprehensive approach for a new hydroxyethyl cellulose-based brine treatment solution to enhance oil recovery. By combining electrocoagulation, HEC modification, and phase behaviour analysis, the described process not only improves desalination efficiency but also offers promising applications for $CO_2$ capture and enhanced oil recovery.

The proposed invention of using Hydroxyethyl Cellulose (HEC)-brine mixtures for Enhanced Oil Recovery (EOR) and brine desalination offers several key advantages over current technologies. The HEC-brine mixture significantly enhances oil recovery by improving the wettability of reservoir rocks and reducing interfacial tension (IFT) between crude oil and the aqueous phase. The addition of HEC results in improved water-wet conditions, leading to better oil displacement and increased recovery rates, which is a clear improvement over conventional surfactants and polymers currently used in EOR processes.

The use of HEC, a biodegradable polymer derived from biomass, reduces environmental concerns associated with synthetic chemicals typically used in EOR. Unlike traditional surfactants and polymers, HEC-based solutions are less harmful to the environment, contributing to more sustainable oil recovery practices.

The HEC-brine mixture demonstrates excellent stability under varying temperature and concentration conditions, which enhances its usability in real-world oilfield conditions. It can form stable emulsions with light crude oil, reducing phase separation and improving the overall performance of the EOR process.

The invention not only serves EOR applications but also addresses the pressing issue of brine desalination and $CO_2$ capture. The electrocoagulation process effectively recovers brine salts and captures $CO_2$ in the form of carbonates, bicarbonates, and other salts, contributing to environmental sustainability by reducing the carbon footprint of desalination processes.

The use of a readily available and renewable resource (biomass-derived HEC) reduces the costs associated with the production and application of chemicals in EOR and desalination processes, making the technology more economically viable compared to conventional methods that rely on expensive synthetic agents Although the present invention has been illustrated and described herein with reference to preferred embodiments, it will be readily apparent to those of ordinary skill in the art that other embodiments may perform similar functions and/or achieve similar results. All such equivalent embodiments are within the spirit and scope of the present invention, are contemplated thereby, and are intended to be covered by the following claims.

The advantages set forth above, and those made apparent from the foregoing description, are efficiently attained. Since certain changes may be made in the above construction without departing from the scope of the invention, it is intended that all matters contained in the foregoing description as illustrative and not in a limiting sense.

It is also to be understood that the following claims are intended to cover all the generic and specific features of the invention herein described, and all statements of the scope of the invention that, as a matter of language, might fall there within.

The invention claimed is:

1. A method for preparing a Hydroxyethyl Cellulose (HEC) based brine solution, said method comprising:
   preparing a brine solution with a salinity ranging from 35,000 ppm to 85,000 ppm;
   obtaining water-soluble HEC from a biomass, comprising extracting purified cellulose from the biomass and modifying the purified cellulose through hydroxyethylation to obtain the water-soluble HEC;
   mixing the obtained water-soluble HEC with the brine solution to obtain a HEC-brine mixture;
   adding the HEC-brine mixture in an Electrocoagulation Cell (EC) to induce electrochemical reactions, wherein air-$CO_2$ mixture is added to the HEC-brine mixture in the EC to induce electrochemical reactions and obtain a foamy HEC-brine solution comprising $CO_2$ absorbed particles and brine salts; and
   separating solid by-products from the foamy HEC-brine solution to obtain the HEC based brine solution, wherein the solid by-products comprise $CO_2$-absorbed particles and brine salts.

2. The method of claim 1, wherein the obtained water-soluble HEC and the brine solution are mixed in a ratio of about 1 g to 10 g of HEC:about 250 ml to 3000 ml of brine to obtain the HEC-brine mixture.

3. The method of claim 2, wherein the ratio is about 2 g to 5 g of HEC:about 750 ml to 1250 ml of brine to obtain the HEC-brine mixture.

4. The method of claim 1, wherein the pH of the HEC-brine mixture is in a range of 10 to 11.

5. The method of claim 1, wherein the brine solution is obtained from desalination unites as a by-product with salinity in the range of 35,000 ppm-85,000 ppm.

6. The method of claim 1, wherein extracting purified cellulose from the biomass comprises:

separating one or more non-cellulosic components from the biomass by Soxhlet extraction to obtain a cellulose-rich biomass;

removing further impurities from the cellulose-rich biomass by acid leaching to obtain a cellulose-rich residue;

purifying the cellulose-rich residue with sodium hydroxide under heat and stirring;

bleaching the purified cellulose-rich residue with acetic acid, hydrogen peroxide, and sulfuric acid for obtaining a bleached cellulose with increased purity.

7. The method of claim 6, wherein said Soxhlet extraction is performed using a mixture of benzene and ethanol for separating one or more non-cellulosic components from the biomass.

8. The method of claim 6, wherein said acid leaching is performed using hydrochloric acid for removing further impurities from the cellulose-rich residue.

9. The method of claim 1, wherein modifying the purified cellulose through hydroxyethylation comprises reacting the bleached cellulose with sodium hydroxide and urea under mild reaction conditions to form the water soluble hydroxyethyl cellulose (HEC).

10. The method of claim 1, wherein the air-$CO_2$ mixture added to the HEC-brine mixture comprises 10% $CO_2$.

11. The method of claim 1, wherein the electrochemical reaction inside the EC is performed at a pH range from 10 to 11.

12. The method of claim 1, wherein the electrochemical reaction inside the EC is performed at a temperature of 22-35° C.

13. The method of claim 1, wherein the electrochemical reaction is performed for 2 to 3 hours, leading to a 35% to 45% decrease in the salinity of the brine solution.

14. The method of claim 1, wherein the EC comprises a magnetic stirrer, rotating at a speed of 100-150 rpm to ensure thorough mixing of the HEC-brine mixture and air-$CO_2$ mixture.

15. The method of claim 1, wherein the EC contains a pair of rectangular aluminium plates serving as electrodes with a spacing distance of 30-50 mm between them.

16. The method of claim 15, wherein said electrodes are connected to a power supply delivering a voltage ranging from 1 to 5 V.

17. The method of claim 1, wherein separating the solid by-products from the foamy HEC-brine solution is performed by vacuum filtration or freeze drying to separate extracted brine salts and $CO_2$-absorbed particles.

18. A foamy HEC-brine solution for Enhanced Oil Recovery (EOR) formed by the method as claimed in claim 1.

* * * * *